United States Patent [19]

Vanotti

[11] Patent Number: 5,085,547
[45] Date of Patent: Feb. 4, 1992

[54] SCREW FIXING DEVICE FOR A CONCRETE CONSTRUCTION ELEMENT

[75] Inventor: Gérard L. Vanotti, Maillat, France

[73] Assignee: Establissements Vape S.A., Saint-Martin-du-Fresne, France

[21] Appl. No.: 730,032

[22] Filed: Jul. 12, 1991

Related U.S. Application Data

[63] Continuation of Ser. No. 485,254, Feb. 26, 1990, abandoned, which is a continuation-in-part of Ser. No. 409,256, Sep. 19, 1989, abandoned.

[30] Foreign Application Priority Data

Sep. 19, 1988 [FR] France .................. 88 12185

[51] Int. Cl.⁵ .................................... F16B 13/06
[52] U.S. Cl. ................................... 411/72; 411/82; 411/178
[58] Field of Search ............... 411/72, 82, 178, 180, 411/73, 81, 17, 103, 107, 108, 109, 166, 366, 427, 429, 430, 900, 901, 904, 908, 258; 52/704, 707, 698

[56] References Cited

U.S. PATENT DOCUMENTS 1,116,545 11/1914 Barrett .................. 411/72 X
2,545,045 3/1951 Rosan ..................... 411/166
4,085,652 4/1978 Vanotti ................... 411/17

FOREIGN PATENT DOCUMENTS

| 81252 | 6/1983 | European Pat. Off. ......... 411/82 |
| 2449470 | 4/1975 | Fed. Rep. of Germany ...... 411/72 |
| 2627746 | 1/1977 | Fed. Rep. of Germany ...... 411/72 |
| 2327887 | 5/1977 | France ............................. 52/704 |
| 2425014 | 11/1979 | France . |
| 1578146 | 11/1980 | United Kingdom ............... 411/82 |

Primary Examiner—Rodney M. Lindsey
Attorney, Agent, or Firm—Kane, Dalsimer Sullivan, Kurucz Eisele, Levy & Richard

[57] ABSTRACT

Screw fixing device for a concrete construction element comprising a screw (1) and a sheath (4) of synthetic material intended to be fixed in the concrete. The sheath and the screw possess a trapezoidal thread. Externally, the sheath possesses peripheral anchoring ribs (7) of triangular section, except in its upper part (6). The slope of the flanks (8) of the ribs facing the entry to the sheath is about 30°. The sheath of synthetic material is surrounded by a metal sheath (12) bearing on these flanks (8) but having a play relative to the other flanks (9) of the ribs.

1 Claim, 2 Drawing Sheets

U.S. Patent  Feb. 4, 1992  Sheet 1 of 2  5,085,547

SCREW FIXING DEVICE FOR A CONCRETE CONSTRUCTION ELEMENT

This is a continuation of copending application Ser. No. 7/485,254 filed on Feb. 26, 1990, now abandoned, which is a continuation-in-part of co-pending application Ser. No. 409,256 filed on Sept. 19, 1989, now abandoned.

FIELD OF THE INVENTION

The invention relates to a screw fixing device for a concrete construction element, comprising a screw having a cylindrical core and a sheath of synthetic material intended to be fixed into the concrete element, this sheath possessing internally a thread corresponding to the thread of the screw and, externally, peripheral anchoring ribs of triangular cross-section and two longitudinal ribs, the sheath of synthetic material further being surrounded by a metal sheath comprising two shells which are mutually assembled by crimping along the longitudinal ribs of the sheath of synthetic material. The sheath can be integrated into the concrete element during its manufacture or positioned subsequently and sealed with quick-setting mortar or resin.

PRIOR ART

A device of this type is described in Patent FR 2,425,014 in the name of the applicant. These devices are particularly intended for fixing rails on concrete cross-ties, in which application the devices have given excellent results. The sheath of synthetic material is overmolded on the sleeper screw whereby unscrewing of the sleeper screw is often difficult.

Furthermore when the screw is rescrewed in the sheath, if the screw is engaged obliquely relatively to the sheath axis, the thread of the screw does not engage correctly into the thread of the sheath and may cut and destroy the thread of the sheath cutting the sheath and reducing the thoughness of the sheath to the traction what may result in destruction of the sheath.

The object of the present invention is further to improve the mechanical properties of these devices, in particular their shear strength and the quality of their anchoring in the concrete and to eliminate the risks of destruction of the sheath by obliquely introducing the screw into the sheath.

SUMMARY OF THE INVENTION

The fixing device according to the invention is a device wherein the upper part of the sheath possesses no peripheral ribs, wherein the inclination of the flanks of the circular ribs facing the entry to the sheath is approximately 30., wherein the metal sheath bears on these flanks but has a play relative to the other flanks of the circular ribs, and wherein the threads of the screw and of the sheath are trapezoidal, the section of the rib constituing the inlet of the thread of the sheath decreasing progressively and homoetheticaly towards the sheath inlet.

The trapezoidal shape of the threads of the sheath and of the screw substantially improves the shear strength of the sheath.

The approximately 30° slope of the upper flanks of the circular ribs of the sheath has the result that compressive stresses are directed onto the peripheral ribs of the sheath and their reaction is directed onto the concrete in optimum directions, avoiding stresses in the fragile zone constituted by the conical zone surrounding the upper part of the sheath, while ensuring good axial retention of the sheath.

The play between the metal sheath and the sheath of synthetic material is equivalent to a radial play which permits expansion of the sheath of synthetic material within the metal sheath, that is to say without this expansion acting on the concrete to create stresses capable of resulting in on the one hand tearing of the metal sheath, the coefficient of expansion of the synthetic material being approximately ten times greater than that of the metal of the metal sheath, and, on the other hand, a stress on the concrete capable of resulting in cracking thereof.

BRIEF DESCRIPTION OF THE DRAWINGS

The attached drawing represents, by way of example, an embodiment of the invention.

DESCRIPTION OF THE PREFERRED EMBODIMENT

Figure 1:
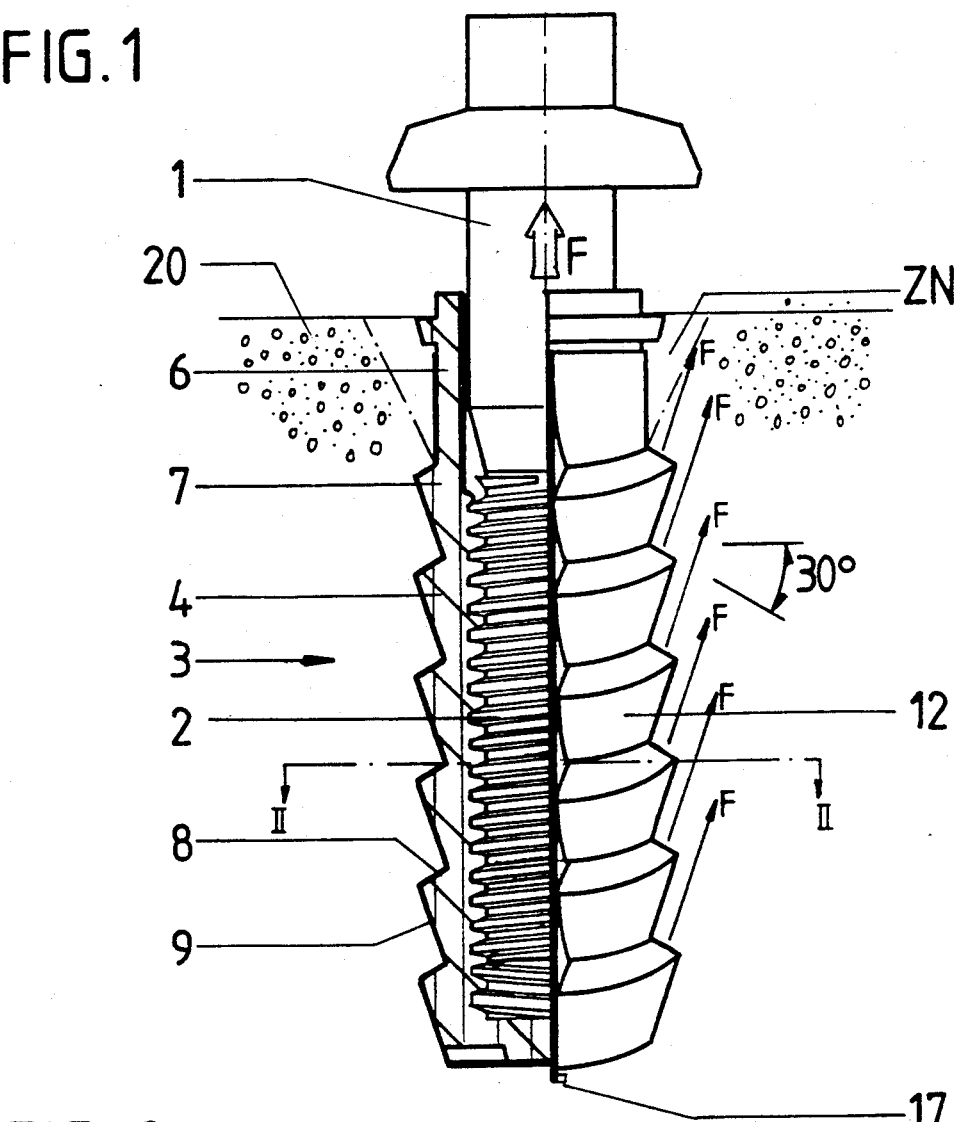
FIG. 1 is an axial half-section through a sheath and its screw, in the present instance a sleeper screw.
Figure 2:
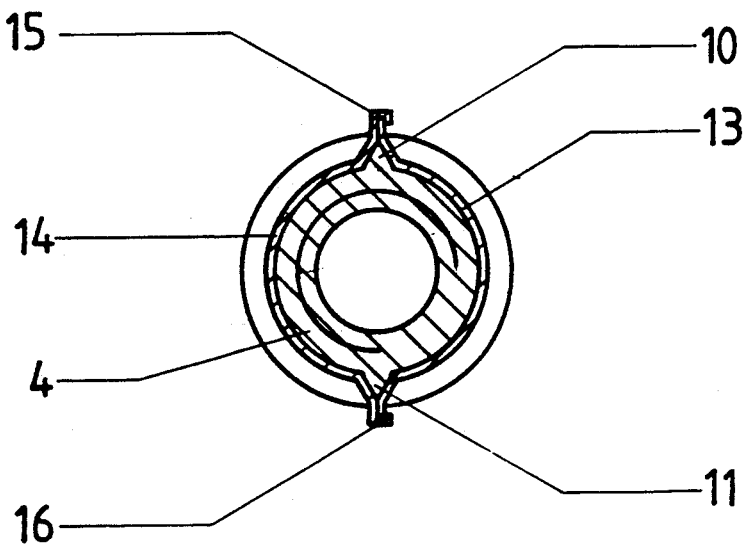
FIG. 2 is a view in radial section along II—II in FIG. 1.
Figure 4:
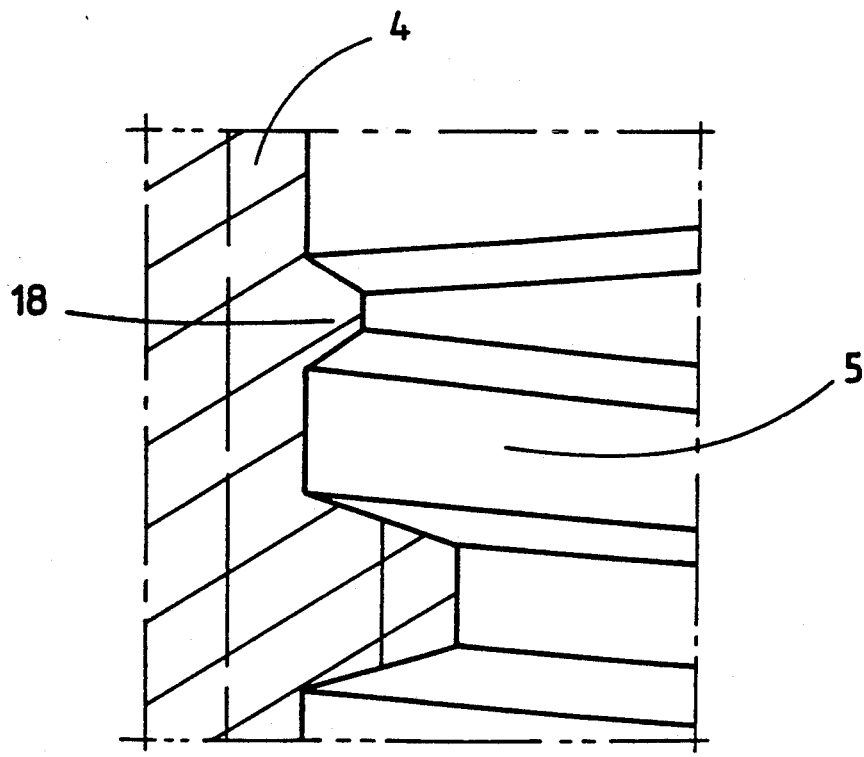
FIG. 4 is an enlargement of the thread of the sheath.

The device shown in FIG. 1 comprises a sleeper screw 1 possessing a threaded part 2 which is screwed into a sheath 3 in the form of a dowel sunk into a concrete cross-tie 20. This anchoring sheath is formed by a sheath 4 of thermoplastic, for example a glass-fiber reinforced polyamide, possessing internally, over the greater part of its length, a thread 5 (FIG. 4) of trapezoidal form homologous to the trapezoidal thread of the foundation bolt 1. In its upper part, the sheath 4 possesses an internally smooth cylindrical part 6. Over the rest of its length, the sheath 4 is provided with a plurality of peripheral ribs 7 having the cross-section of a triangle with rounded apex, that is to say forming, for each rib, a frustoconical surface 8 facing the entry to the sheath and a frustoconical surface 9 facing the lower end of the sheath. The thermoplastic sheath 4 is further provided with two longitudinal ribs 10 and 11 (FIG. 2) intended to prevent the rotation of the sheath of the concrete.

The polyamide sheath 4 is surrounded by a steel sheath 12 formed by two shells 13 and 14 (FIG. 2) fixed by crimping along two generatrices 15 and 16 situated opposite the longitudinal ribs 10 and 11 of the sheath of synthetic material 4, and also at 17 at the lower end of the sheath 4. This metal sheath (FIG. 3) closely fits the shape of the sheath of synthetic material 4 and ensures good adhesion of the concrete to the device, the adhesion of the concrete to the synthetic material being very poor.

Figure 3:
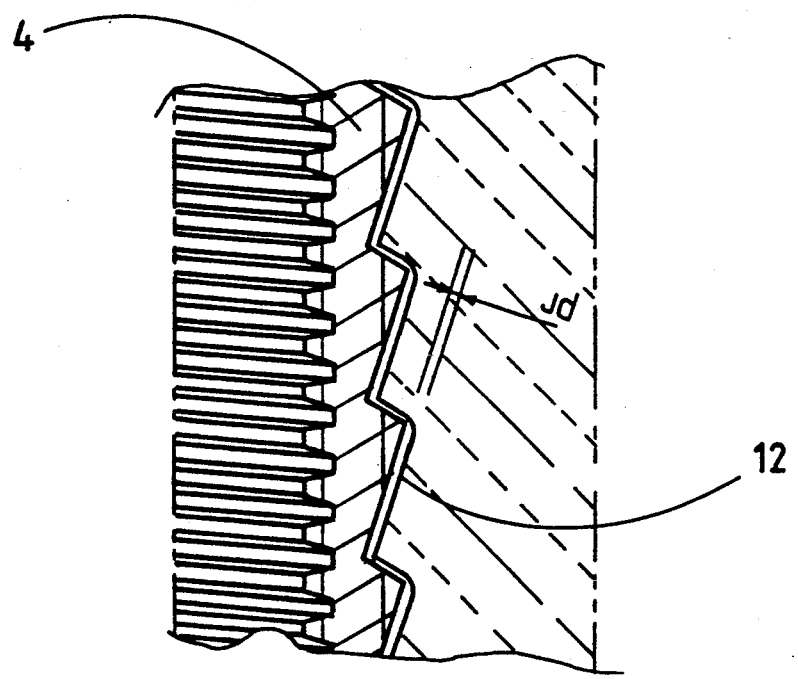
FIG. 3 is a detailed view of FIG. 1.

The metal sheath 12 is in contact with the flanks 8 of the annular swellings 7, but by contrast it is separated from the lower flanks 9 of its beadings by a play Jd (FIG. 3). This oblique play Jd corresponds to a radial play which permits expansion of the sheath of synthetic material 4 within the metal sheath 12. The effect of this play is thus to compensate the differences between the coefficients of expansion of the two sheaths 4 and 12.

The slope of the upper flanks 8 of the peripheral ribs 7, relative to a plane perpendicular to the axis of the sheath, is equal to 30. When a tensile force F acts on the foundation bolt 1, the sheath 3 bears on the concrete with the flanks 8 of these ribs 7. The effect of the inclination of these flanks 8 is to direct the stresses F of these bearing zones in oblique directions such that the stresses move away from the fragile zone of the concrete represented by the conical part ZN, while still exhibiting a sufficient component parallel to the axis of the sheath, which component is necessary to oppose the traction F.

The upper end of the thread of the sheath is particular. The section of the rib 18 forming the inlet of the thread decreases progressively and homotheticaly towards the inlet of the sheath. This configuration assures a correct engagement of the thread of the sleeper screw 1 and sheath 3 whatever the position of the sleeper screw is relatively to the sheath. It is therefore not necessary that the sleeper screw axis coincides with the sheath axis when the screw is introduced into the sheath, what practically never occurs. The end of the sleeper screw may be simply conical, ground. The sheath does not risk to be destroyed by the screw.

The device according to the invention provided good electrical insulation of the rail lines by virtue of the very good dielectrical resistance of polyamide. These devices also show a high capacity to absorb certain harmful frequencies in the system for fixing in a concrete medium, which makes their use particularly valuable for fixing railroad tracks or joining prefabricated elements of vibrated or prestressed concrete, for example tunnel segments.

I claim:

1. A screw fixing device for a concrete construction element, comprising a screw having a cylindrical core and a sheath of synthetic material intended to be fixed into the concrete element, this sheath possessing internally a thread corresponding to the thread of the screw and, externally, peripheral anchoring ribs of triangular cross section and two longitudinal ribs, the sheath of synthetic material further being surrounded by a metal sheath comprising two shells which are mutually assembled by crimping along the longitudinal ribs of the sheath of the synthetic material, wherein the upper part of the sheath possesses no peripheral ribs, wherein the inclination of the flanks of the peripheral ribs facing the entry to the sheath is approximately 30°, wherein the metal sheath bears of these flanks but has a play (Jd) relative to the other flanks of the peripheral ribs, and wherein the threads of the screw and of the sheath are trapexoidal in cross section, the section of the rib constituting the inlet of the thread of the sheath decreasing progressively, the dimensions of the said section decreasing according to a similarity transformation towards the sheath inlet.

* * * * *